(12) United States Patent
Clevenger et al.

(10) Patent No.: US 8,296,949 B2
(45) Date of Patent: Oct. 30, 2012

(54) APPARATUS FOR DESIGNING A TUBING CONFIGURATION

(75) Inventors: John W. Clevenger, Antioch, TN (US);
Donald A. Gibson, Stoughton, WI (US);
David Sarcona, Oregon, WI (US);
Michael J. Senetar, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1372 days.

(21) Appl. No.: 11/618,166

(22) Filed: Dec. 29, 2006

(65) Prior Publication Data
US 2008/0156569 A1   Jul. 3, 2008

(51) Int. Cl.
*B21D 51/16* (2006.01)

(52) U.S. Cl. ........ 29/890.08; 29/33 D; 29/33 T; 29/234; 72/16.4; 72/37; 180/89.2; 180/296; 180/309

(58) Field of Classification Search .............. 29/890.08, 29/33 D, 33 T, 234; 72/16.4, 37
See application file for complete search history.

(56) References Cited

U.S. PATENT DOCUMENTS

| | | | |
|---|---|---|---|
| 4,947,666 A * | 8/1990 | Hametner et al. | 72/37 |
| 5,657,233 A | 8/1997 | Cherrington et al. | |
| 5,819,062 A | 10/1998 | Srikantappa | |
| 6,587,746 B1 | 7/2003 | D'Souza | |
| 6,778,871 B2 | 8/2004 | Holman et al. | |
| 6,810,401 B1 | 10/2004 | Thompson et al. | |
| 6,811,344 B1 | 11/2004 | Kobayashi et al. | |
| 6,867,768 B2 | 3/2005 | Sakakura et al. | |
| 6,871,108 B2 | 3/2005 | Carlucci et al. | |

* cited by examiner

*Primary Examiner* — Richard Chang
(74) *Attorney, Agent, or Firm* — Kunzler Law Group, pc

(57) ABSTRACT

An apparatus for designing a tubing configuration comprising modules that receive tube design input, interpret a tube design input, calculate a final tube design, and display a final tube design. The tube design input may include point locations, bend criteria and end conditions, among others. The apparatus may further include modules that determine whether the tube design input exceeds a complexity threshold, comprises a minimum set of information, and comprises a conflicting or erroneous design. The apparatus may further include modules that determine and optimize the manufacturing cost as well as determine the manufacturability of the tube. The apparatus may further include modules that store operational challenges corresponding to emissions reduction features and secondary components.

29 Claims, 14 Drawing Sheets

Setup
| | | |
|---|---|---|
| Units | Inches | LIST |

Tubing
- Tube OD: 5.0
- Thickness: 16 GA
- Material: 304L SS

| Points | X | Y | Z | Radius |
|---|---|---|---|---|
| P0 | 0 | 0 | 0 | N/A |
| P1 | 10 | 1 | -5 | 3 |
| P2 | 25.65 | 12 | -6 | 4.5 |
| P3 | 20 | 20.16 | 1.19 | N/A |

ADD / REMOVE

| End Conditions | PT 1 | | PT 4 | |
|---|---|---|---|---|
| Bead | NO | | NO | N/A |
| Flare definition | 70°, straight | LIST | None | LIST |
| Size change adapter | None | LIST | None | LIST |
| Dent condition | None | LIST | None | LIST |
| Dent quantity | N/A | | N/A | |
| Slot type | None | LIST | None | LIST |
| Slot quantity | N/A | | N/A | |
| Half-couple | NO | | NO | N/A |
| Threading | None | LIST | None | LIST |

Tube coating:
- ■ Black paint
- ☐ Green paint
- ☐ Primer
- ☐ Zinc chromate

Tube interior finish: None — LIST
Tube exterior finish: None — LIST

Desired quantity: 1
Estimated cost (per unit): $150.00

SAVE DESIGN  REQUEST FOR QUOTE  MANUFACTURING DRAWING

P1  P2  P4  P6  P5
ATM1
P3

402 ↘

| Setup | | | | | |
|---|---|---|---|---|---|
| Units | Inches | LIST | | | |

Tubing
708 — Tube OD         4.0
     Thickness       16 GA
710 — Material        316L SS

| 702 — Points | X | Y | Z | Radius — 704 |
|---|---|---|---|---|
| P1 | 0 | 0 | 0 | N/A |
| P2 | 10.5 | 0 | 0 | 4.5 |
| P3 | 14.5 | -12 | -6 | 3 |
| P4 | 21 | -6 | -20 | N/A |
| 802 — ATM1 - 12", 22L SF | 23 | -4.5 | -31.75 | N/A |
| P5 | 30 | 1 | -46 | N/A |
| P6 | 30 | 15 | -46 | 4.5 |

ADD
REMOVE

706 — End Conditions      PT 1                     PT 6
      Size change adapter  Swage up to 5.0"  LIST  None  LIST 712 — Tube coating   714 — Tube interior finish
      ☐ Black paint       None              LIST      Desired quantity
      ☐ Green paint  716 — Tube exterior finish                  1
      ■ Primer            None              LIST      Estimated cost (per unit)
      ☐ Zinc chromate                                 $2,000.00
                                                              ↳ 506
      512

SAVE DESIGN                    REQUEST FOR QUOTE

Fig. 8

| Set of emissions reduction features | Set of operational challenges |
|---|---|
| High pressure fuel injection | Increased sensitivity to fuel lubricity, increased sensitivity to micro-particles |
| Multiple fuel injections | Increased soot load on oil; reduced oil change interval |
| Exhaust gas recirculation | Increased soot load on oil; reduced oil change interval; reduced fuel economy; potential acid production |
| Diesel oxidation catalyst | Reduced fuel economy (weight and back pressure); sensitivity to acid and combustion byproducts; catalyst aging and degradation |
| NOx adsorption catalyst | Reduced fuel economy (weight and back pressure); catalyst aging and degradation, ultra-low sulfur fuel requirement (low lubricity oil) |
| Diesel particulate (soot) filter | Reduced fuel economy (weight and back pressure); catalyst aging and degradation; sensitivity to ash production |
| Selective catalytic reduction | Reduced fuel economy (weight and back pressure) |
| Three-way catalyst | Reduced fuel economy (weight and back pressure); catalyst aging and degradation |
| Four-way catalyst | Reduced fuel economy (weight and back pressure); catalyst aging and degradation |
| Ultra-low sulfur fuel requirement | Low fuel lubricity |
| Low crankcase emissions requirement | Crankcase out emissions must be reduced in open crankcase applications; increased soot load on oil and reduced fuel economy in closed crankcase applications |

Fig. 9

APPARATUS FOR DESIGNING A TUBING CONFIGURATION

BACKGROUND OF THE INVENTION

1. Field of the Invention

This invention relates to the rapid design of emissions component installations, and more particularly relates to installing emissions components with internal combustion engines.

2. Description of the Related Art

Emissions standards for combustion engines have been rapidly advancing over the past few years. Engine manufacturers have responded with a variety of technologies designed to meet the new emissions standards. The result has been a proliferation of engine controls and components which have forced installation difficulties onto original equipment manufacturers (OEMs) using these engines.

A primary difficulty for OEMs is that they must integrate the engine intake and exhaust tubing with a vehicle or application. The OEM may also need to integrate tubular members that may be structural support elements of the application. Various emissions technologies alter the engine or exhaust locations for each engine, and in some circumstances require the OEM to integrate components within the intake or exhaust that the OEM would not have had to consider a few years ago. These complications force OEMs to spend time engineering and designing the tubing for each engine into each application. Further, they must communicate with the engine manufacturer and the tubing manufacturer to clarify tubing manufacturing capabilities and component requirements. The simple process of ordering a single tubing configuration can require days of communication before even a price quote can be finalized.

Another difficulty for OEMs is that new emissions technologies have secondary effects on engine operation, emissions, fuel economy, and durability. This difficulty also affects the end user of a vehicle or application. For example, a particular emissions technology may affect the oil change interval, and thereby require a truck fleet to change some operating logistics in response. In another example, a particular emissions technology may require an additive for the fuel, and this may require parts that the OEM should install at the time of manufacturing a vehicle.

Many secondary technologies exist to mitigate some of the secondary effects caused by new emissions technologies. However, the effects of new emissions technologies and the available mitigating technologies are not known by the OEM designer of the application. Further, since many of the mitigating technologies are more expensive than conventional counterparts, the original designer of the emissions technology may not recommend or include a mitigating technology for every application. Therefore, the use of mitigating technologies requires hours of research to answer questions that the OEM or end user may not even know to ask.

From the foregoing discussion, it should be apparent that a need exists for an apparatus, system, and method that provides for rapid design of emissions component installations related to internal combustion engines. Beneficially, such an apparatus, system, and method would allow the user to rapidly design and order tubing constructions. Such an apparatus, system, and method may be of further benefit if it interprets an emissions component design and recommends one or more technologies to mitigate some of the secondary effects of the emissions technology.

SUMMARY OF THE INVENTION

The present invention has been developed in response to the present state of the art, and in particular, in response to the problems and needs in the art that have not yet been fully solved by currently available emissions component installation systems. Accordingly, the present invention has been developed to provide an apparatus, system, and method for rapid design of emissions component installations that overcome many or all of the above-discussed shortcomings in the art.

An apparatus is provided with modules to functionally execute rapid design of emissions component installations. The installation may comprise an internal combustion engine, one or more emissions reduction components and features, an intake pipe and one or more exhaust pipes. The exhaust pipe may contain one or more aftertreatment components. The installation may further comprise one or more tubes that provide support and structure rather than act as a fluid conduit. The modules in the described embodiments comprise: a tube configuration module, a tube calculator module, a display module, a user interface module, a complexity verification module, a design integrity module, a design compatibility detection module, a manufacturing module, a costing module, and an optimization module. In a further embodiment, the apparatus includes an emissions challenge module and a secondary component selection module.

The tube configuration module may be configured to interpret a tube design input. The tube calculator module may be configured to calculate a final tube design based on the tube design input. The display module may be configured to display the final tube design to the user. The tube configuration tool may further comprise a user interface module which may be configured to receive the tube design input from the user.

The complexity verification module may prompt the user to simplify the tube design input if the tube design input exceeds a complexity threshold. The design integrity module may be configured to set an error indicator if the tube design input does not comprise a minimum set of information. The design compatibility detection module may be configured to set a conflict indicator if the tube design input comprises one of a conflicting design input and an erroneous design input.

The manufacturing module may be configured to determine the final tube design manufacturability. The costing module may be configured to determine a manufacturing cost of the final tube design, provide the manufacturing cost to the display module, and the display module may be further configured to display the manufacturing cost to the user. The costing module may be further configured to update the manufacturing cost in response to user-entered changes in the tube design.

The optimization module may be configured to alert the user when a user-entered change in the tube design input contributes a threshold amount to the manufacturing cost.

The emissions challenge module may be configured to store a set of operational challenges corresponding to a set of emissions reduction features, and to store a set of operational challenges addressed corresponding to a set of secondary components.

The secondary component selection module may be configured to interpret a user-specified emissions scheme comprising at least one emissions reduction feature, and to provide at least one emissions reduction feature to the emissions challenge module. The secondary component selection module may be further configured to receive at least one secondary component recommendation from the emissions challenge module such that the secondary component recommendation addresses at least one emissions challenge corresponding to at least one emissions reduction feature. The secondary component selection module may be further configured to provide at least one secondary component selection to the display module for display to the user.

In one embodiment, a method is presented including the operations to perform rapid design of an emissions component in accordance with the present invention. The method may have operations comprising receiving a tube design input from a user, where the tube design input comprises point locations, bend criteria, and end conditions. The operations may further include interpreting the tube design input, and calculating a final tube design. The operations may further comprise determining the manufacturability and the manufacturing cost of the final tube design, and displaying the final tube design, the manufacturing cost, and a drawing suitable for manufacture of the final tube design to the user. The operations may comprise updating the manufacturing cost and the drawing suitable for manufacture in response to user-entered changes in the tube design input. In one embodiment, the operations may include alerting the user when a user-entered change contributes a threshold amount to the manufacturing cost.

In one embodiment, the operations may further comprise determining whether the tube design input exceeds a complexity threshold, and prompting the user to simplify the tube design input if the tube design input exceeds the complexity threshold. The operations may include determining whether the tube design input one of a conflicting design input, an erroneous design input, and a tube design input comprising less than a minimum set of information in one embodiment. The operations may further comprise interpreting a user-specified emissions scheme, determining at least one secondary component recommendation based on the emissions scheme, and displaying at least one secondary component recommendation to the user.

A system is presented for rapid design of an emissions component installation in accordance with the present invention. The system may comprise an internal combustion engine, a user-specified emissions scheme comprising at least one emissions reduction component and/or feature, and a user-specified tube design input comprising point locations, bend criteria, and end conditions. The system may further comprise an emissions component installation design tool, the emissions component installation design tool comprising at least one member selected from the group consisting of a tube configuration tool and a secondary component selection tool. The tube configuration tool may be configured to interpret the tube design input, calculate a final tube design based on the tube design input, and display the final tube design to a user. The secondary component selection tool may be configured to interpret a user-specified emissions scheme comprising at least one emissions reduction component and/or feature, and determine at least one secondary component that addresses at least one operational challenge corresponding to at least one emissions reduction feature.

A method is presented to enhance an emissions component installation design. The method in the disclosed embodiments includes executing an emissions component installation design tool, the emissions component installation design tool comprising at least one member selected from the group consisting of a tube configuration tool and a secondary component selection tool.

The tube configuration tool may be configured to interpret a tube design input comprising point locations, bend criteria, and end conditions, calculate a final tube design based on the tube design input, and display the final tube design to a user. The tube configuration tool may be further configured to evaluate the final tube design for alternative embodiments of the tube design input, generate a tube design input alternative such that the tube design input alternative costs less than the tube design input, and display the tube design input alternative to the user.

The secondary component selection tool is configured to interpret a user-specified emissions scheme comprising at least one emissions reduction feature, determine at least one secondary component that addresses at least one operational challenge corresponding to at least one emissions reduction feature, and display at least one secondary component to the user.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is an illustration of one embodiment of a user display, a drawing, and a tube design input in accordance with the present invention;

FIG. 8 is an illustration of an alternate embodiment of a user display, a drawing, and a tube design input in accordance with the present invention;

FIG. 9 is an illustration of an embodiment of a set of emissions reduction features corresponding to a set of operational challenges in accordance with the present invention;

DETAILED DESCRIPTION OF THE INVENTION

Figure 1:
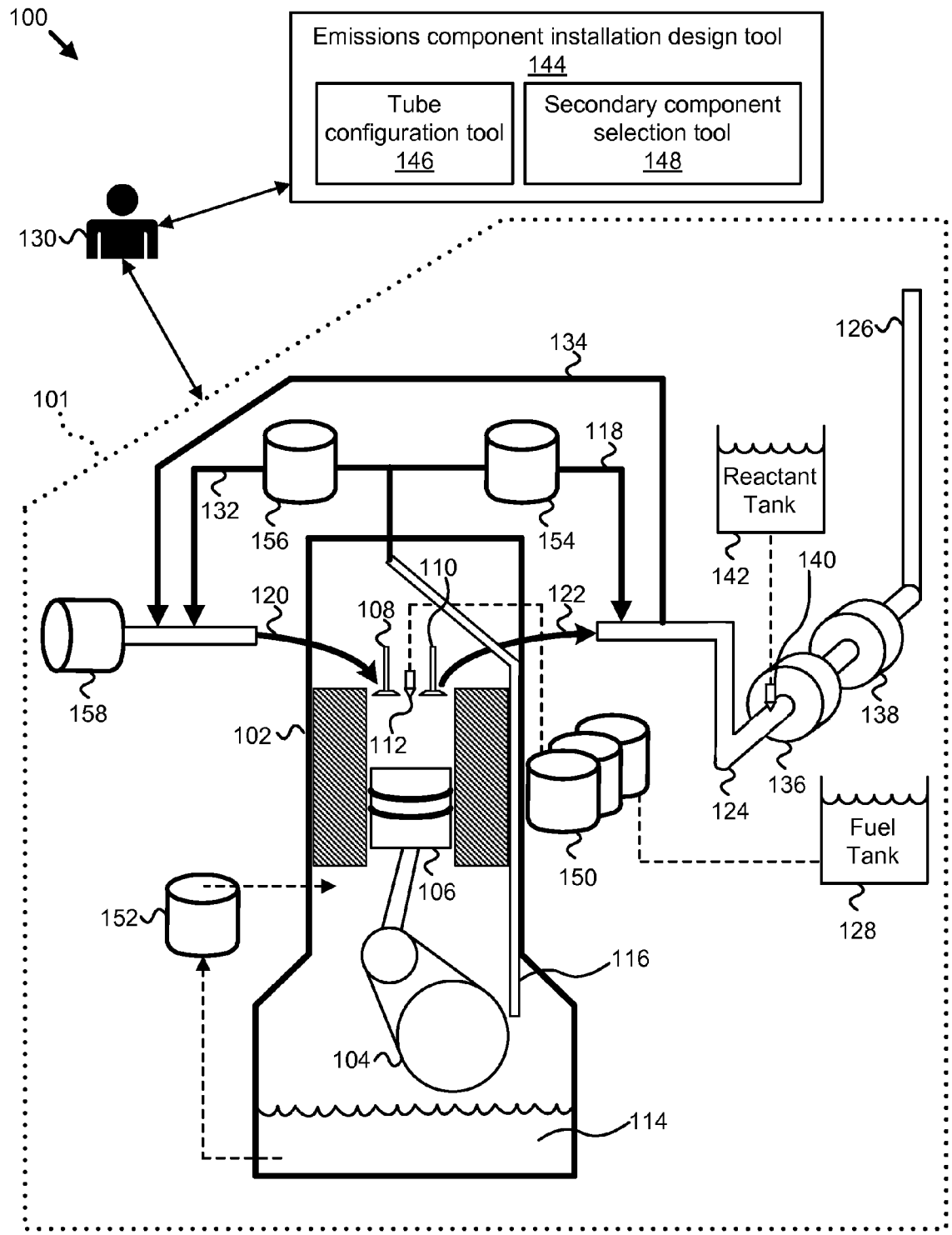
FIG. 1 is a schematic block diagram depicting one embodiment of a system for rapid design of an emissions component installation in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer programmed product may take any form capable of generating a signal, causing a signal to be generated, or causing execution of a program of machine-readable instructions on a digital processing apparatus. A computer programmed product may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram depicting one embodiment of a system 100 for rapidly designing emissions component installations 101 in accordance with the present invention. The emissions component installation 101 may be an existing, planned, or hypothetical installation 101. The system 100 may comprise an internal combustion engine 102.

In one embodiment, the internal combustion engine 102 may comprise a crankshaft 104, a piston 106, an intake valve 108, and an exhaust valve 110. The engine may comprise multiple pistons 106, and multiple valves 108, 110 for the engine 102, and for each piston 106. The engine 102 may further comprise a fuel injector 112. The engine 102 may have a crankcase containing lubricant oil 114, and a crankcase vent 116 configured to vent crankcase vapors. The engine may have an air intake 120, and an exhaust 122. The crankcase vent 116 may be configured to vent crankcase fumes to the exhaust 122 or to the atmosphere (not shown). The exhaust 122 may run through a downpipe 124, and then to an exhaust stack 126 for final venting to the atmosphere. The injector 112 may be configured to receive fuel from a fuel tank 128, possibly via a fuel pump (not shown).

The system 100 may further comprise an emissions scheme specified by a user 130, where the emissions scheme comprises at least one emissions reduction feature. The descriptions for a number of potential emissions reduction features follow, although other emissions reduction features are known to those of skill in the art and are contemplated within the invention.

One feature may be the crankcase vent 116 returning 132 crank case fumes to the air intake 120 rather than the exhaust 122. In installations 101 where the crankcase fumes are counted in the emissions regulations, this feature would reduce the contribution of particulates and unburned oil from the crank case fumes. This feature may be called a "closed crankcase" in some installations 101.

Another feature may be an exhaust gas recycle (EGR) 134, returning some of the exhaust 122 gases to the air intake 120. This feature is known to reduce production of nitrogen oxides (NOx). An EGR 134 may comprise valves, coolers, sensors, and other features not critical to the invention and not shown in FIG. 1. Further, the EGR may comprise a modulation of the valves 108, 110 such that some residual exhaust gases remain in the cylinder above the piston 106 for the next combustion cycle rather than traveling through the exhaust 122 to the intake 120.

Another feature may be the inclusion of one or more aftertreatment devices 136, 138. Many combinations of aftertreatment devices 136, 138 are possible, including a particulate filter (soot filter) for directly filtering particulates, selective catalytic reduction (SCR) for reducing NOx, a diesel oxidation catalyst (DOC) for cleaning up unburned hydrocarbons, a three-way catalyst for cleaning up NOx, unburned hydrocarbons, and carbon monoxide, a four-way catalyst for cleaning up particulates in addition to the targets of the three-way catalyst, a NOx adsorption system for trapping and reducing NOx, as well as other aftertreatment devices known in the art. In one embodiment, a DOC 136 is placed just after the downpipe 124 and before a soot filter 138. An injector 140 may be configured to inject upstream of the DOC 136, and a reactant tank 142 may be configured to provide reactant, which may be diesel fuel, to the injector 140.

Another feature may be the use of multiple fuel injections to the engine 102 from the fuel injector 112. The fuel system may be configured to provide one or more "pilot" injections, one or more "post" injections, and even a rate shaping of a "main" fuel injection event.

The system 100 may further comprise an emissions component installation design tool 144. The emissions component installation design tool 144 may comprise a tube configuration tool 146, and/or a secondary component selection tool 148. The tube configuration tool 146 may be configured to help the user 130 rapidly design the tubing for the exhaust 122, the intake 120, and/or various tubes for moving fluids or supporting components within the installation 101. The term tube as used herein is not limited to enclosed structures with a circular cross-section. Structures with cross-sections that are circular, square, rectangular, parallelogram, triangular, elliptical, polygonal, and the like are all considered within the scope of the term tube as used herein. Further, structures that are not completely enclosed, for example a tube with a cross-section like a "U," are also considered within the scope of the term tube as used herein.

The secondary component selection tool 148 may be configured to help the user 130 determine appropriate secondary components to mitigate operational challenges presented by the emissions reduction feature(s) of the installation 101. For example, a secondary component may comprise a fuel filter 150 configured to improve fuel lubricity form the fuel tank 128 in installations 101 where an ultra-low sulfur fuel is required to support an aftertreatment device 136, 138. Another secondary component may comprise a fuel filter 150 with improved water separation where an emissions reduction feature reduces the fuel economy of the installation 101, and a high pressure fuel injector 112 requires fuel with a minimal viscosity. A secondary component may comprise a fuel-borne catalyst fuel filter 150 configured to provide catalyst directly to the fuel to reduce particulate formation during combustion, and to deposit catalyst on an aftertreatment component 136, 138 to support the aftertreatment component 136, 138 component.

The secondary component may also be a lubrication filter 152 configured to remove acid from the lubricating oil 114. The secondary component may be a micro-screen bypass lubrication filter 152 configured to cycle a percentage of the oil through a high resolution filter and thereby effectively eliminate much smaller fines than full-flow lubrication filters 152 can achieve. The secondary component may be a centrifuge lubrication filter 152 capable of removing soot from the lubricating oil 114.

In some embodiments, the secondary component may be a closed crankcase ventilation filter 156 configured to reduce the particulate burden on the air intake 120, and to reduce lubricating oil 114 consumption. The secondary component may be an open crankcase ventilation filter 154 configured to reduce lubricating oil 114 consumption, and particulate burden to a soot filter 138 or to the atmosphere. In some embodiments, the secondary component may be an enhanced air intake system 158 configured to improve fuel economy and increase the service life of the air intake 120 system.

Other secondary components which mitigate some of the operational challenges introduced by various emissions reduction features are known in the art and are contemplated within the scope of the invention. It is within the skill of one in the art to apply the basic concepts of the secondary component selection tool 148 such that they function fully with newly created emissions reduction features and with secondary components created to mitigate the operational challenges introduced by newly created emissions reduction features. Therefore, future emissions reduction features and secondary components which mitigate operational challenges introduced by those features are considered within the scope of the invention.

Figure 2:
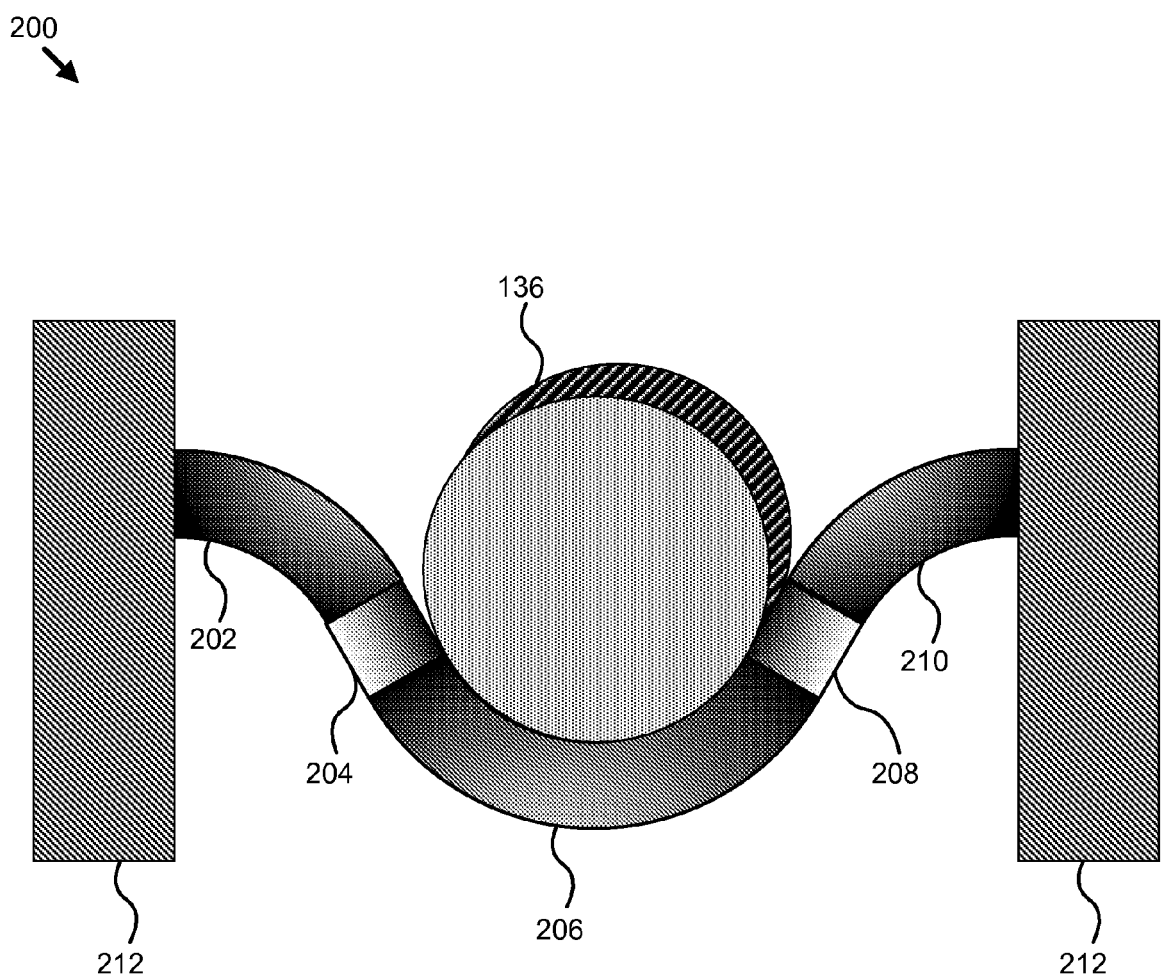
FIG. 2 is a schematic block diagram depicting one embodiment of a final tube design comprising a design for a tube comprising a structural element of an application.

FIG. 2 is a schematic block diagram depicting one embodiment of a tube 200 comprising a structural element of an installation 101. The tube 200 may comprise a first bent radius 202, a first straight segment 204, a second bent radius 206, a second straight segment 208, and a third bent radius 210. The tube 200 may be attached to a supporting structure 212, which may be a firewall in a vehicle compartment. The tube 200 may support an aftertreatment component 136.

Figure 3:
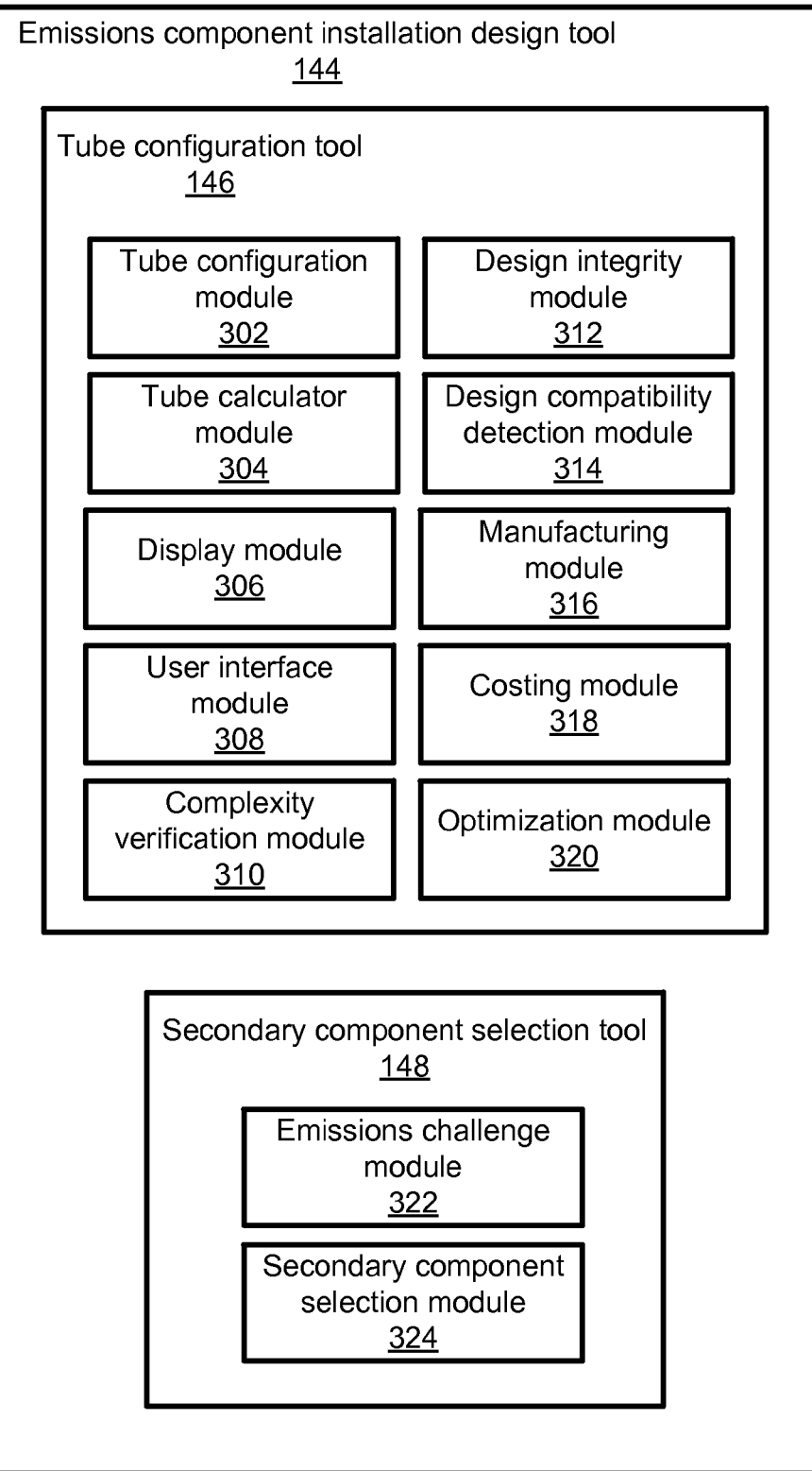
FIG. 3 is a schematic block diagram depicting one embodiment of an emissions component design tool in accordance with the present invention.

FIG. 3 is a schematic block diagram depicting one embodiment of an emissions component installation design tool 144 in accordance with the present invention. The emissions component installation design tool 144 may comprise a tube configuration tool 146 and a secondary component selection tool 148. The tube configuration tool 146 and secondary component selection tool 148 may contain modules configured to execute the functions of the tools 146, 148. The basic functions of one embodiment of the modules are described below, and more detailed examples of embodiments of the modules are described in FIGS. 4 through 6.

The tube configuration tool 146 may comprise a tube configuration module 302, a tube calculator module 304, and a display module 306. The tube configuration module 302 may be configured to interpret a tube design input. The tube calculator module 304 may be configured to calculate a final tube design based on the tube design input. The display module 306 may be configured to display the final tube design to the user 130. The tube configuration tool 146 may further comprise a user interface module 308 which may be configured to receive the tube design input from the user 130.

The tube configuration tool 146 may further comprise a complexity verification module 310, a design integrity module 312, and a design compatibility detection module 314. The complexity verification module 310 may prompt the user 130 to simplify the tube design input if the tube design input exceeds a complexity threshold. The design integrity module may be configured to set an error indicator if the tube design input does not comprise a minimum set of information. The design compatibility detection module 314 may be configured to set a conflict indicator if the tube design input comprises one of a conflicting design input and an erroneous design input.

The tube configuration tool 146 may also comprise a manufacturing module 316, a costing module 318, and an optimization module 320. The manufacturing module 316 may be configured to determine the final tube design manufacturability. The costing module 318 may be configured to determine a manufacturing cost of the final tube design, provide the manufacturing cost to the display module 306, and the display module 306 may be further configured to display the manufacturing cost to the user 130. The costing module 318 may be further configured to update the manufacturing cost in response to user-entered changes in the tube design.

The optimization module 320 may be configured to alert the user 130 when a user-entered change in the tube design input contributes a threshold amount to the manufacturing cost.

The secondary component selection tool 148 may comprise an emissions challenge module 322 and a secondary component selection module 324. The emissions challenge module 322 may be configured to store a set of operational challenges corresponding to a set of emissions reduction features, and to store a set of operational challenges addressed corresponding to a set of secondary components.

The secondary component selection module 324 may be configured to interpret a user-specified emissions scheme comprising at least one emissions reduction feature, and to provide at least one emissions reduction feature to the emissions challenge module 322. The secondary component selection module 324 may be further configured to receive at least one secondary component recommendation from the emissions challenge module 322 such that the secondary component recommendation addresses at least one emissions challenge corresponding to at least one emissions reduction feature. The secondary component selection module 324 may be further configured to provide the at least one secondary component selection to the display module 306 for display to the user 130.

Figure 4:
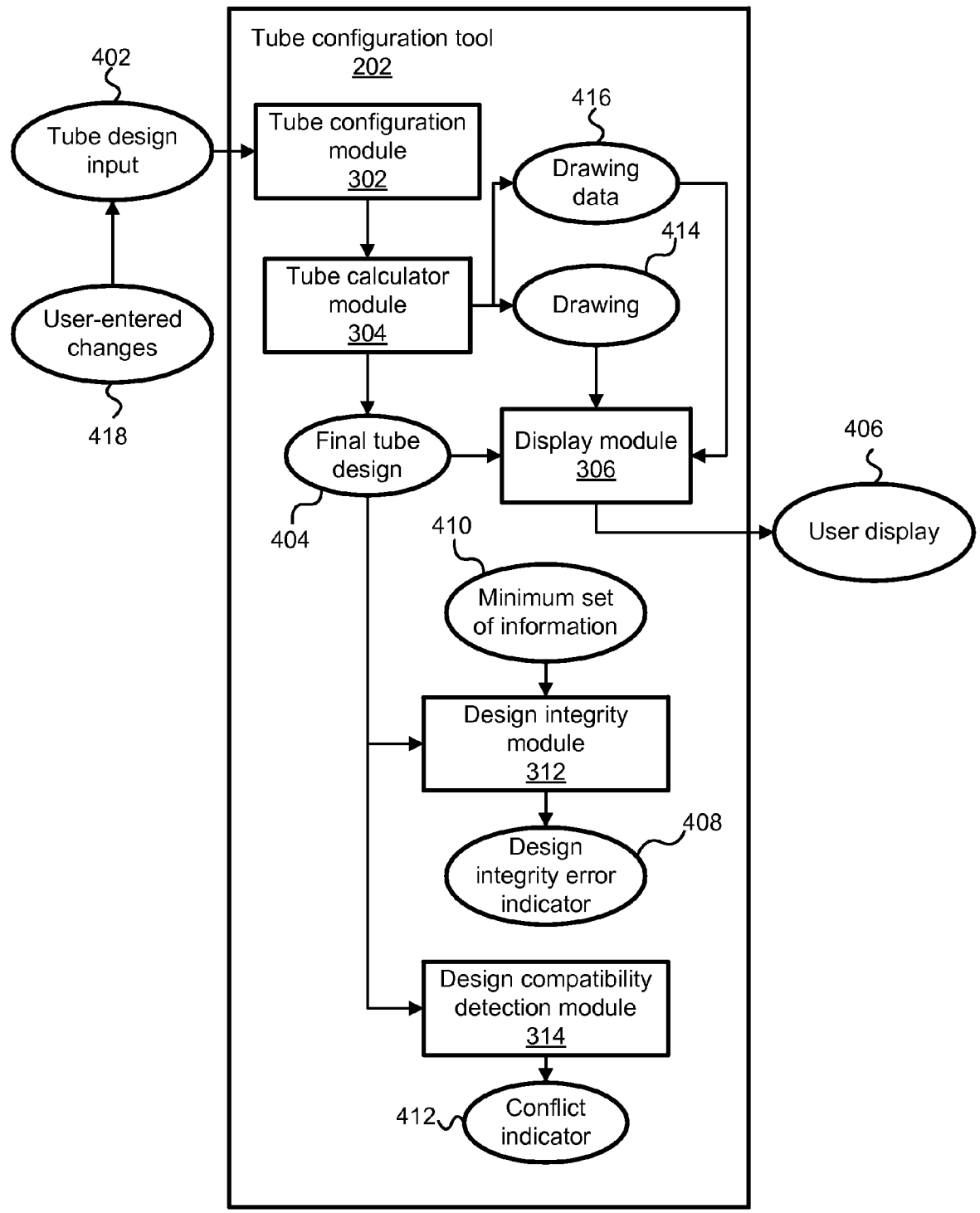
FIG. 4 is a schematic block diagram depicting one embodiment of a tube configuration tool in accordance with the present invention.

FIG. 4 is a schematic block diagram depicting one embodiment of a tube configuration tool 146 in accordance with the present invention. The tube configuration tool 146 may be configured to interpret a tube design input 402. The tube design input 402 may comprise point locations, bend criteria, and end conditions for the tube. The tube design input 402 may further comprise a tube outer diameter, a tube wall thickness, and/or a tube material. Of course, equivalent information such as a tube inner diameter and tube wall thickness could likewise be used for the tube design input 402. The tube design input 402 may further comprise a tube coating, a tube interior finish, and/or a tube exterior finish.

Point locations may comprise points in three dimensional space representing locations relative to portions of the tube—for example a series of points in the radial center of various tube segments, or at the top of various tube segments. Bend criteria may comprise bend radii or bend angles. In one embodiment, the bend criterion for a point location indicates the bend radius of the center of the tube around the point location, such that the radial center of the tube passes over the point location, a prior point location, and a subsequent point location.

The end conditions for the tube may comprise any end condition information for the tube that may be useful in the tube manufacturing art for the contemplated installation 101. For example, the end conditions may comprise a flare definition, a dent condition, a slot type, and/or a size change adapter. In a further example, the end conditions may comprise a type of threading, specifications for a half couple, and/or specifications for a crimp.

The tube material may comprise any tubing material. For example, the tubing material may comprise aluminum, steel, copper, plastic, rubber, and silicone. Many types of steel and plastic are used in the art, and all of these are contemplated within the scope of the invention, as well as any other materials used in the tube manufacturing art.

The tube design input 402 may be entered by a user 130, or stored somewhere within the system 100. For example, the tube design input 402 may be a standard tube design input 402 stored in the tube configuration tool 202, wherein the user 130 selects the standard tube design input 402 as a starting point before adding user-entered changes 418.

The tube calculator module 304 may be configured to calculate a final tube design 404 based on the tube design input 402. The calculation of the final tube design 404 may comprise unit conversions from a user 130 set of units to a set of units used by the tube configuration tool 202, and calculations of the information to convert the tube design input 402 into a graphical image for a drawing 414. The final tube design 404 may comprise the design for a tube comprising a fluid conduit for an installation 101, or a tube comprising a structural element of some device or part of an installation 101.

The drawing 414 may be a drawing 414 suitable for manufacture of the final tube design 404. For example, a list of materials and part number required to build the final tube design 404, and front, top, side, and end views of the final tube design 404 may be part of the drawing 414. The tube calculator module 304 may provide a simplified drawing 414 until the user 130 makes an input indicating a request for a manufacturing drawing 414. In one embodiment, the drawing 414 may be a simple depiction of the final tube design 404 to allow the user 130 to visualize the design.

The tube calculator module 304 may calculate drawing data 416 sufficient to draw the final tube design 404 in a computer aided design (CAD) program. Configuring the tube calculator module 304 to provide the drawing data 416 for any of the many CAD programs available—for example AutoCAD®, ProE®, Visio®, SolidWorks®, Unigraphics®—is a mechanical step for one of skill in the art. For example, the drawing data 416 for AutoCAD may comprise a series of drawing objects, and properties to place and dimension the objects such that a drawing 414 of the final tube design 404 can be generated in AutoCAD.

The display module 306 may be configured to receive the drawing 414, drawing data 416, and/or final tube design 404 and display them to the user 130 via a user display 406.

The tube configuration tool 202 may further comprise a design integrity module 312 configured to set a design integrity error indicator 408 if the final tube design 404 does not contain a minimum set of information 410. The minimum set of information 410 may include a check that the final tube design 404 contains sufficient information to complete the drawing 414. In one embodiment, the minimum set of information 410 may include a tubing outer diameter, tubing material, at least two point locations, and tubing end conditions for each point location that comprises an end of a tube. The display module 306 may be configured (not shown) to display the design integrity error indicator 408 to the user 130, and may be further configured to report the reason for the design integrity error indicator 408 to the user 130.

The tube configuration tool 202 may further comprise a design compatibility detection module 314 configured to set a conflict indicator 412 if the final tube design 404 has a conflicting design input or an erroneous design input. Conflicting design input may comprise information within the final tube design 404 that does not agree with other information within the final tube design 404. For example, the tube design input 402 may be such that the final tube design 404 wraps around on itself and has a tube intersecting itself in an embodiment where a self-intersecting tube is invalid.

Errors may comprise information that does not appear to be what the user 130 wishes. For example, if all of the point locations in a tube design input 402 are about 10 inches apart, but one set of point locations are 10,000 inches apart, the design compatibility detection module 314 may be configured to set the conflict indicator. In another example, if a tube design input 402 contains a size change adapter end condition and a flare up end condition on the same end of a tube, the design compatibility detection module 314 may be configured to set the conflict indicator because those end conditions may not be typically combined in that manner for a given application.

Figure 5:
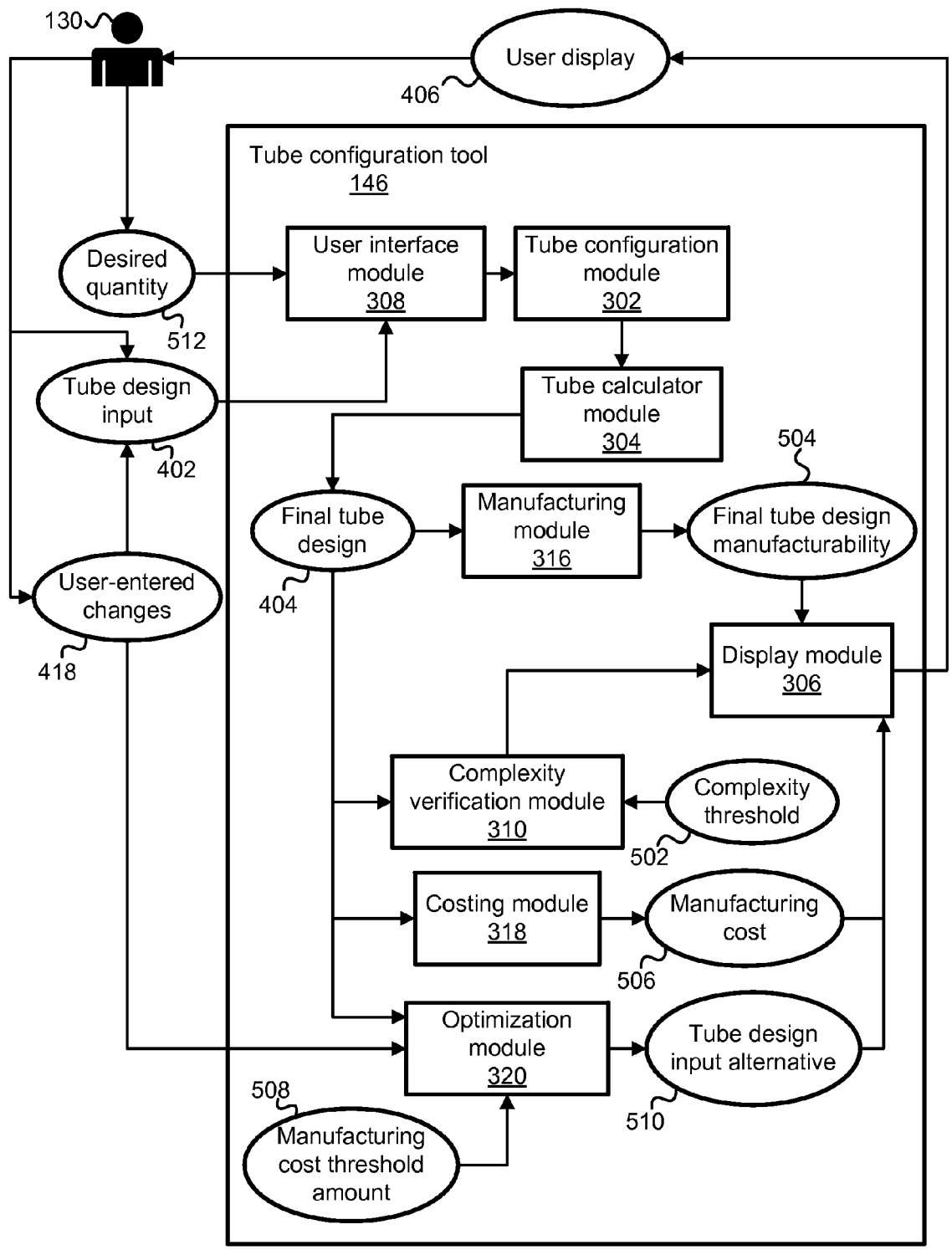
FIG. 5 is a schematic block diagram depicting an alternative embodiment of a tube configuration tool in accordance with the present invention.

FIG. 5 is a schematic block diagram depicting an alternative embodiment of a tube configuration tool 146 in accordance with the present invention. The tube configuration tool 146 may comprise a user interface module 308 configured to receive a desired quantity 512 and a tube design input 402 from the user 130, and to provide the desired quantity 512 and the tube design input 402 to the tube configuration module 302. The desired quantity 512 may be the number of tubes manufactured according to the tube design input 402 that the user 130 may wish to purchase. The user 130 may provide additional user-entered changes 418 to the tube design input 402. The tube configuration module 302 may be configured to provide the tube design input 402 to the tube calculator module 304.

The tube configuration tool 146 may comprise a manufacturing module 316 configured to determine the final tube design manufacturability 504. The final tube design manufacturability 504 may be a discrete value such as "YES" or "NO," or the final tube design manufacturability 504 may be a continuous value. In one example, the final tube design manufacturability 504 comprises a value between 1 and 100, wherein a 1 indicates an easy to manufacture design, and 100 indicates an extremely difficult to manufacture design. The manufacturing module 316 may utilize elements of the final tube design 404 to determine the final tube design manufacturability 504—for example the tubing material, tubing outer diameter, and the bending radius of the sharpest bend within the final tube design 404. The display module 306 may display the final tube design manufacturability 504 to the user 130 via the user display 406.

The tube configuration tool 146 may comprise a complexity verification module 310 configured to determine whether the tube design input 402 exceeds a complexity threshold 502. The complexity verification module 310 may be further configured to prompt the user 130, via the display module 306, if the tube design input 402 does exceed the complexity threshold 502. In one embodiment, the complexity verification module 310 is configured to determine if a tube design input 402 is too complex for the tube configuration tool 146. For example, the tube configuration tool 146 may be configured to manage three independent tubes, and the complexity threshold 502 may indicate that three independent tubes are supported. In the example, if the user 130 inputs a fourth independent tube, the complexity verification module 310 may prompt the user 130 to simplify the tube design input 402 because the complexity of the tube design input 402 exceeds the complexity threshold 502.

The tube configuration tool 146 may comprise a costing module 318 configured to determine a manufacturing cost 506 of the final tube design 404. For example, the costing module 318 may check a list of materials required to complete the final tube design 404 against a price list to determine a manufacturing cost 506. The costing module 318 may further include estimates for labor, special parts, customer discounts, and the like. The costing module 318 may be configured to update the manufacturing cost 506 in response to user-entered changes 418 in the tube design input 402. The costing module 318 may be configured to calculate a manufacturing cost 506 in response to a user 130 request for a cost estimate.

In one embodiment, the user interface module 308 is configured to receive a desired quantity 512 from the user 130, and the costing module 318 is configured to determine the manufacturing cost based on the desired quantity and a plant capacity. For example, if a final tube design 404 requires the use of a production tool with limited capacity, or a production tool that must be purchased, the costing module 318 may be configured to calculate whether the manufacturing capacity exists to complete the desired quantity 512 for the user 130 within a specified time period, and whether extra costs will be incurred—opening a third manufacturing shift, or purchasing a new production tool, for example—in achieving the production target. The costing module 318 may be configured to be capable of estimating production costs where manufacturing capacity is a potential issue, or the costing module 318 may be configured to prompt the user 130 with contact information to request a pricing estimate.

The tube configuration tool 146 may further comprise an optimization module 320 configured to determine whether a user-entered change 418 contributes greater than a manufacturing cost threshold amount 508 to the manufacturing cost 506. In one embodiment, the optimization module 320 may be configured to determine a tube design input alternative 510, similar to a user-entered change 418, whenever the user-entered change 418 contributes an amount to the manufacturing cost 506 greater than the manufacturing cost threshold amount 508, such that the tube design input alternative contributes less than the manufacturing cost threshold amount 508 to the manufacturing cost 506.

The manufacturing cost threshold amount 508 may comprise an absolute amount of money, for example a user-entered change 418 that contributes over $10 to the manufacturing cost 506. The manufacturing cost threshold amount 508 may also be a percentage of the manufacturing cost 506, for example any user-entered change 418 that contributes more than 30% of the manufacturing cost 506 of the final tube design 404.

In one embodiment, the manufacturing cost threshold amount 508 comprises a percentage premium of a user-entered change 418 relative to an available alternative. For example, if a user 130 enters an end condition of "Swage up to 6 inches at end 'A'" and this increases the manufacturing cost 506 by $15, where in one example a straight 70° flare may achieve the 6 inch end mating for $6, the 250% price premium of the user-entered change 418 versus an available alternative yields a positive determination by the optimization module 320 where the manufacturing cost threshold amount 508 may be set to a 100% price premium. Other types of threshold amounts to detect a high cost user-entered change are within the skill of one in the art, and are contemplated within the scope of the invention. The type of threshold, and the level of the threshold, may be features selectable by the user 130 during the operation of the tube configuration tool 146.

The optimization module 320 may further be configured to evaluate the final tube design 404 for alternative embodiments of the tube design input 402 that may generate a lower manufacturing cost 506, and provide the alternatives as a tube design input alternative 510 to the display module 306. The optimization module 320 may be further configured to suggest a tube design input alternative 510 of an available configuration when the user-entered change 418 indicates a tube design input 402 of an unavailable configuration. For example, if the user 130 requests a bend radius at one point location of 2.5 inches where an available production tool can provide a bend radius of 2.75 inches, the optimization module 320 may suggest a tube design input alternative 510 of 2.75 inches which may reduce the manufacturing cost 506 for the user 130.

Figure 6:
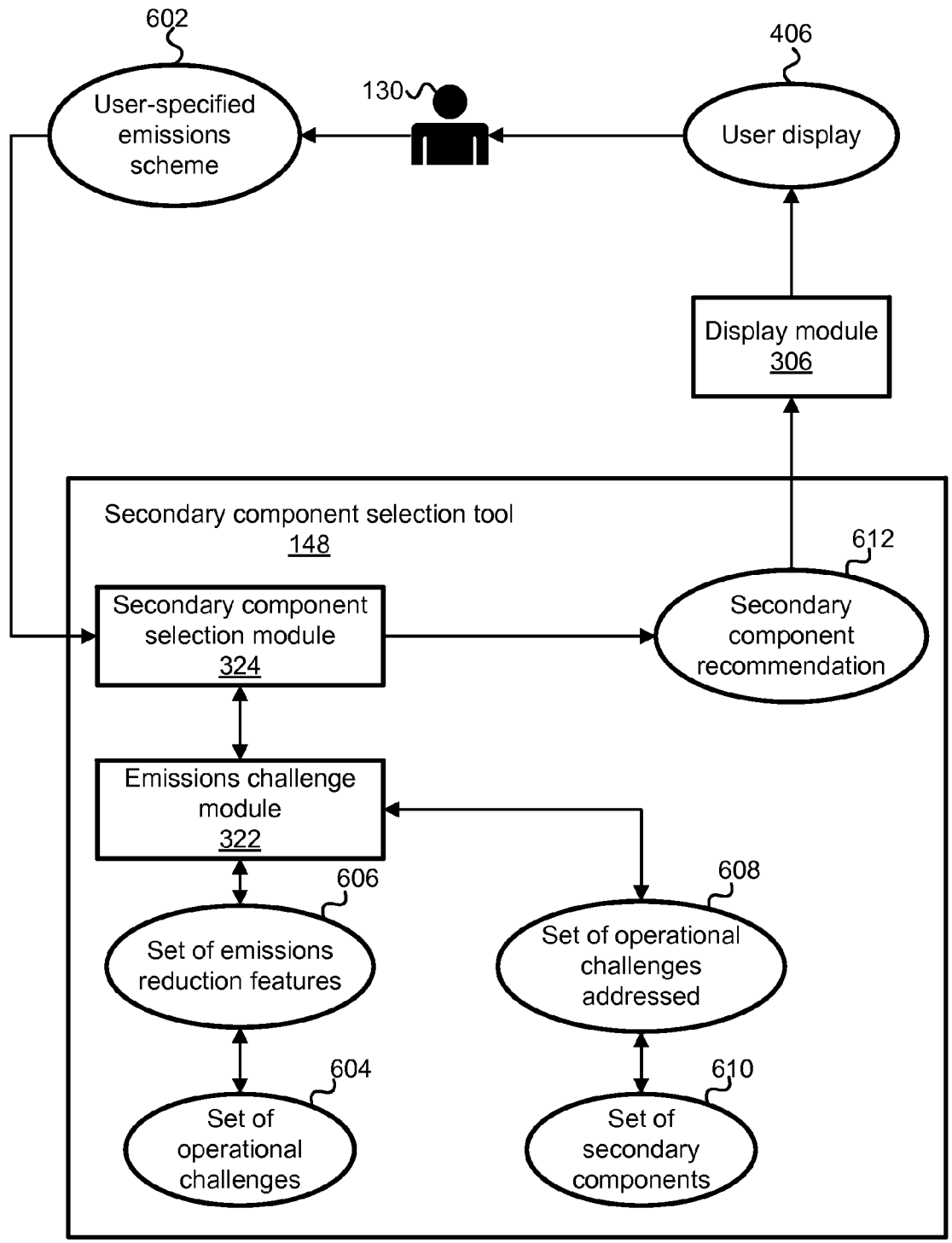
FIG. 6 is a schematic block diagram depicting one embodiment of a secondary component selection tool in accordance with the present invention.

FIG. 6 is a schematic block diagram depicting one embodiment of a secondary component selection tool 148 in accordance with the present invention. The secondary component selection tool 148 may include an emissions challenge module 322 configured to store a set of operational challenges 604 corresponding to a set of emissions reduction features 606. For example, the set of emissions reduction features 606 may comprise EGR, a NOx adsorbing catalyst aftertreatment component, and an ultra-low sulfur fuel requirement. The set of operational challenges may comprise "increased soot load on oil, reduced oil change interval, reduced fuel economy, and potential acid buildup in the oil" corresponding to EGR, "reduced fuel economy, catalyst aging and degradation, and ultra-low sulfur fuel requirement" corresponding to the NOx adsorbing catalyst aftertreatment component, and "reduced fuel lubricity (causing nozzle wear and reduced fuel economy)" corresponding to the ultra-low sulfur fuel requirement.

The emissions challenge module 322 may further comprise a set of operational challenges addressed 608 corresponding to a set of secondary components 610. For example, the set of secondary components 610 may comprise an ultra-low ash oil specification, an improved lubricity fuel filter (e.g. a filter providing a surfactant additive), and a centrifuge lubrication filter. The set of operational challenges addressed 608 may comprise "reduced ash production, improved fuel economy, increased sensitivity to acid" corresponding to the ultra-low ash oil specification, "improved fuel lubricity" corresponding to the improved lubricity fuel filter, and "improved ash removal from oil, and increased oil change interval" corresponding to the centrifuge lubrication filter.

The secondary component selection tool 148 may include a secondary component selection module 324. The secondary component selection module 324 may be configured to interpret a user-specified emissions scheme 602 which may comprise at least one emissions reduction feature. The secondary component selection module 324 may be further configured to provide the at least one emissions reduction feature to the emissions challenge module 322, and to receive at least one secondary component recommendation 612 from the emissions challenge module 322 such that the secondary component addresses at least one operational challenge corresponding to the at least one emissions reduction feature.

In a continuing example, the user-specified emissions scheme 602 may comprise an EGR, a NOx adsorbing catalyst aftertreatment component and an ultra-low sulfur fuel requirement. The secondary component selection module 324 may provide the emissions reduction features of the user-specified emissions scheme 602 to the emissions challenge module 322, and receive a secondary component recommendation 612 of "improved lubricity fuel filter" and "centrifuge lubrication filter" from the emissions challenge module 322.

In one embodiment, the emissions challenge module 322 may be configured to compare the set of operational challenges 604 with the set of operational challenges addressed 608 to determine which of the set of secondary components 610 should be provided as the at least one secondary component recommendation 612. In the example, the emissions challenge module 322 selects improved lubricity fuel filter to address the lower lubricity of the ultra-low sulfur diesel fuel, and the centrifuge lubrication filter to reduce the increased soot loading in the oil from the EGR, and to offset the lower oil change interval imposed by the EGR. The emissions challenge module 322 does not select the ultra-low ash oil specification in the example, because increased sensitivity to ash was not indicated by the user-specified emissions scheme 602, and the acid sensitivity of ultra-low ash oil is contraindicated by the EGR in the example.

The emissions challenge module 322 may comprise a simple indication and contraindication scheme as illustrated in the example. The emissions challenge module 322 may comprise a decision tree, a weighted cost-benefit matrix, and the like. The set of operational challenges addressed 608 may further comprise a benefit quantity—for example a given secondary component may increase fuel economy 3% where another secondary component may increase fuel economy 5%—that may be used in the selection of the at least one secondary component recommendation 612. Further, the emissions challenge module 322 may be configured to weight some factors higher—for example oil change intervals or fuel economy—according to preferences expressed by the user 130. These and other variations of the emissions challenge module are mechanical steps for one of skill in the art, and are considered within the scope of the invention.

The secondary component selection module 324 may be further configured to provide the at least one secondary component recommendation 612 to the display module 306. The display module 306 may be configured to display the at least one secondary component recommendation 612 to the user 130, which may occur through a user display 406.

FIG. 7 is an illustration of one embodiment of a user display 406, a drawing 414, and a tube design input 402 in accordance with the present invention. The drawing 414 may comprise one view, for example the front view, of a tubing configuration. The view may be selectable and rotatable by a user 130.

The tube design input 402 may comprise tubing point locations 702, tube bending criteria 704, and tube end conditions 706. The point locations 702 may comprise coordinate locations for the point locations 702. The point locations 702 may correspond to points within the drawing 714, and may refer to points at intersecting lines running through the radial center of the tubing configuration. Other coordinate systems to use point locations 702 may be used, such as point locations for intersecting lines that run along the highest Z-axis portion of the tubing configuration. In some embodiments, a tubing cross-section does not have a radial center—for example a tube with a triangular cross-section, and a geometric center may be used.

The tube bending criteria 704 may comprise a bending radius at each of a set of point locations. In one embodiment, the point locations 702 at the ends of the tubing configuration do not have an associated bending radius 704.

The tube end conditions 706 may comprise a series of selections, drop down boxes, and user 130 entered values. The end conditions 706 may comprise a flare definition, for example a 70° straight flare or no flare. The end conditions 706 may further comprise a dent condition, for example indents or outdents, and a dent quantity. The end conditions 706 may further comprise a slot type, such as standard slots or torca slots, and a slot quantity. The end conditions 706 may further comprise a threading and a half coupling specification. Other types of tubing end conditions 706 are known in the art and are considered within the scope of the invention.

The tube design input 402 may further comprise a tubing outer diameter 708 and a tubing material 710. The tube design input 402 may further comprise a tubing thickness or gauge.

The tube design input a tube coating 712, which may comprise a set of selections as shown in FIG. 7, a drop-down list, a user 130 entered value, and the like. The tubing design input 402 may further comprise a tube interior finish 714 and a tube exterior finish 716.

The illustration of FIG. 7 also shows one embodiment of a desired quantity 512 and a manufacturing cost 506 on the user interface 406. Various other features, such as saving a design, sending a request for a quote, and generating a manufacturing drawing are shown on the user interface 406 for illustration.

FIG. 8 is an illustration of an alternate embodiment of a user display 406, a drawing 414, and a tube design input 402 in accordance with the present invention. In addition to slightly different embodiments of various elements of the tube design input 402 from FIG. 7, the embodiment of FIG. 8 comprises at least one aftertreatment component 802. In one embodiment, the aftertreatment component 802 may be selected from a drop-down box when the user 130 adds a point location 702 to the set of point locations. In another embodiment, the aftertreatment component 802 may be pre-loaded into the tube design input 402 based on the customer selecting an engine 102 and emissions scheme 602 from a previous menu (not shown). In another embodiment, the user 130 may "build" an aftertreatment component 802 to place in the point location 702 list by adding a point location, and inserting the physical dimensions of the aftertreatment component 802 into a menu (not shown).

In the embodiment of FIG. 8, the user 130 may select the component 802 ATM1-12", 22L SF, which may represent a 12" long, 22 liter capacity soot filter, from a list. The user interface 406 may be configured to automatically enter the coordinate information for the ATM1 point location based on the previous point P4, the direction of the tubing configuration at the attachment point P4 that is suggested by the line between P3 and P4, and the dimensions of the component 802 ATM1. The tubing configuration tool 146 may be further configured, in an example embodiment, to automatically generate any configuration information required to mate the basic tube at P4 to the aftertreatment component 802, or the user 130 may be allowed to enter this information in a separate menu (not shown). In the example embodiment, any parts required to integrate the aftertreatment component 802 within the tubing configuration is thus included automatically in the manufacturing cost 506 without user 130 input or knowledge required.

FIG. 9 is an illustration of an embodiment of a set of emissions reduction features 606 corresponding to a set of operational challenges 604 in accordance with the present invention.

Figure 10:
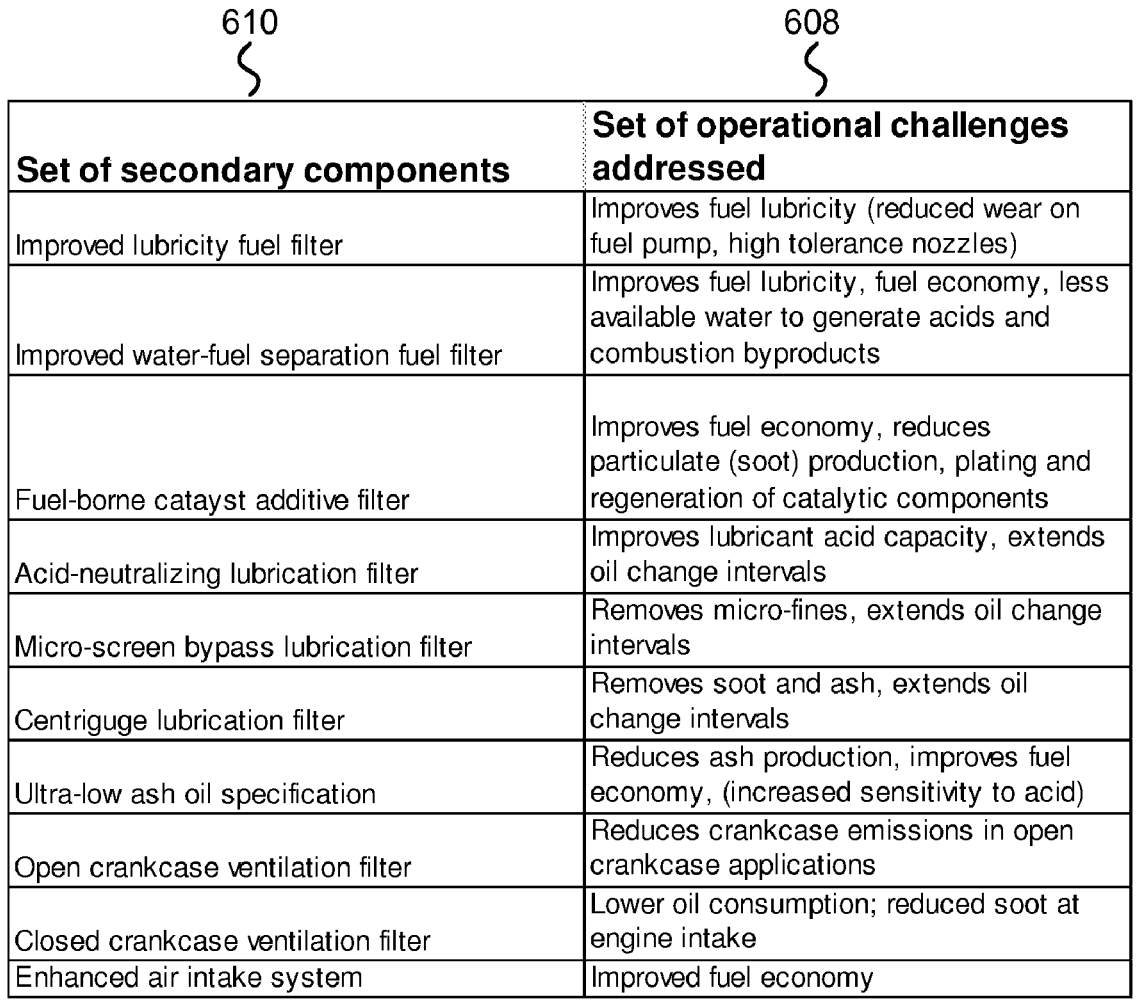
FIG. 10 is an illustration of an embodiment of a set of secondary components corresponding to a set of operational challenges addressed in accordance with the present invention.

FIG. 10 is an illustration of an embodiment of a set of secondary components 610 corresponding to a set of operational challenges 608 addressed in accordance with the present invention.

The schematic flow chart diagrams herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 11A:
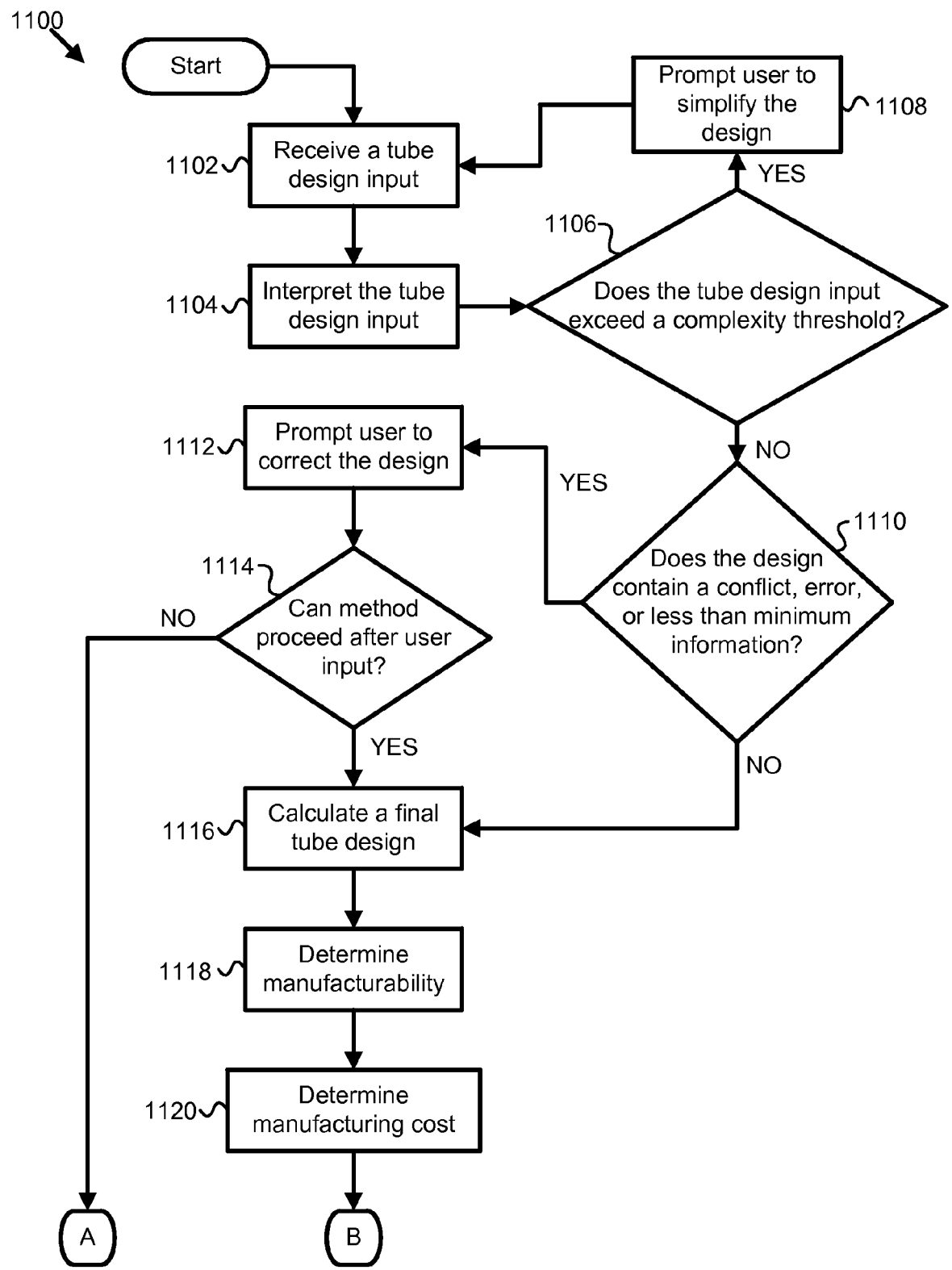
FIG. 11A is a schematic flow chart illustrating one embodiment of a method for rapid design of an emissions component installation in accordance with the present invention.

FIG. 11A is a schematic flow chart illustrating one embodiment of a method 1100 for designing an emissions component installation 101 in accordance with the present invention. The method 1100 may begin with the user interface module 308 receiving 1102 a tube design input 402 from a user 130. The tube configuration module 302 may interpret 1104 the tube design input 402. The complexity verification module 310 may then check 1106 whether the tube design input 402 exceeds a complexity threshold 502, and prompt 1108 the user to simplify the design 402 if it is too complex. The design integrity module 314 and design compatibility detection module 314 may then check 1110 if the design contains a conflict, error, or less than a minimum set of information 410.

If the check 1110 is positive, the display module 306 may prompt 1112 the user to correct the design 402. The design integrity module 312 and design compatibility detection module 314 may check 1114 whether the method 1100 can proceed after user-entered changes 418 based on the prompt 1112. In one embodiment, if the design correction prompt 1112 was based on a suspected user 130 error as determined by the design compatibility detection module 314, the method 1100 may be deemed able to continue (1114 with a "YES" determination) because the suspected user 130 error is presumed not to be an error after the user 130 is prompted 1112 to check the error.

Figure 11B:
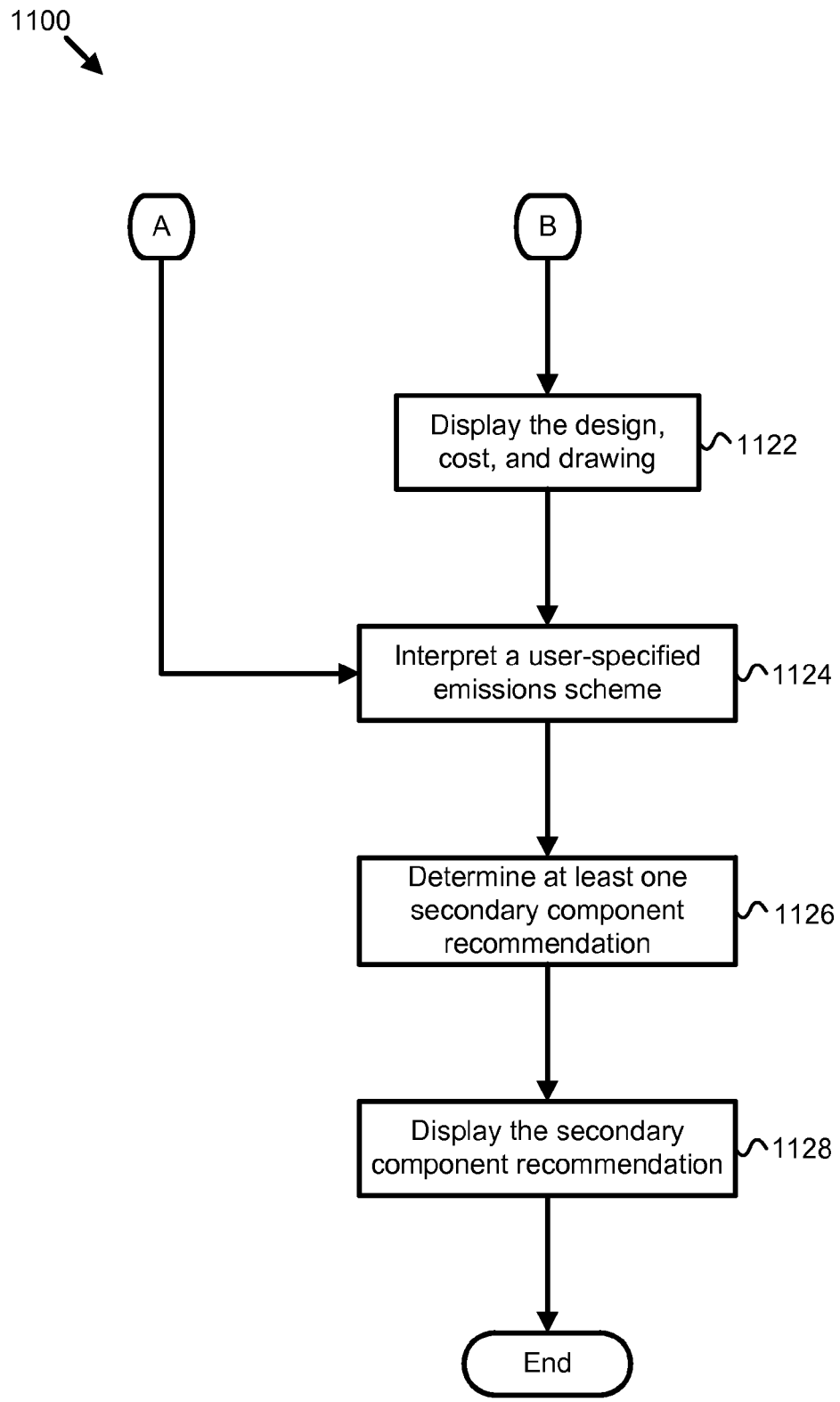
FIG. 11B is a schematic flow chart continuing illustration of one embodiment of a method for rapid design of an emissions component installation in accordance with the present invention.

If the method 1100 cannot continue (1114 with a "NO" determination), the method 1100 may continue "A" on FIG. 11B. If the method 1100 can continue (1114 with a "YES" determination), the method 1100 may continue with the tube calculator module 304 calculating 1116 a final tube design 404. The manufacturing module 316 may then determine 1118 the manufacturability of the final tube design 404. The costing module 318 may determine 1120 the manufacturing cost 506 of the final tube design 404.

Referring to FIG. 11B, the method 1100 may continue "B" with the display module 306 displaying 1122 the final tube design 404, the manufacturing cost 506, and a drawing 414 which may be a drawing suitable for manufacture of the final tube design 404. In one embodiment, the method 1100 may continue "A", or proceed from the display 1122, with the secondary component selection module 322 interpreting 1124 a user-specified emissions scheme 602 comprising at least one emissions reduction feature. The secondary component selection module 322 may determine 1126 at least one secondary component recommendation 612 by passing t least one emissions reduction feature based on the emissions scheme 602 to the emissions challenge module 324, and receiving at least one secondary component recommendation 612 where the recommended secondary component addresses at least one operational challenge corresponding to at least one emissions reduction feature. The display module 306 may then display 1128 the secondary component recommendation 612 to the user 130.

Figure 12:
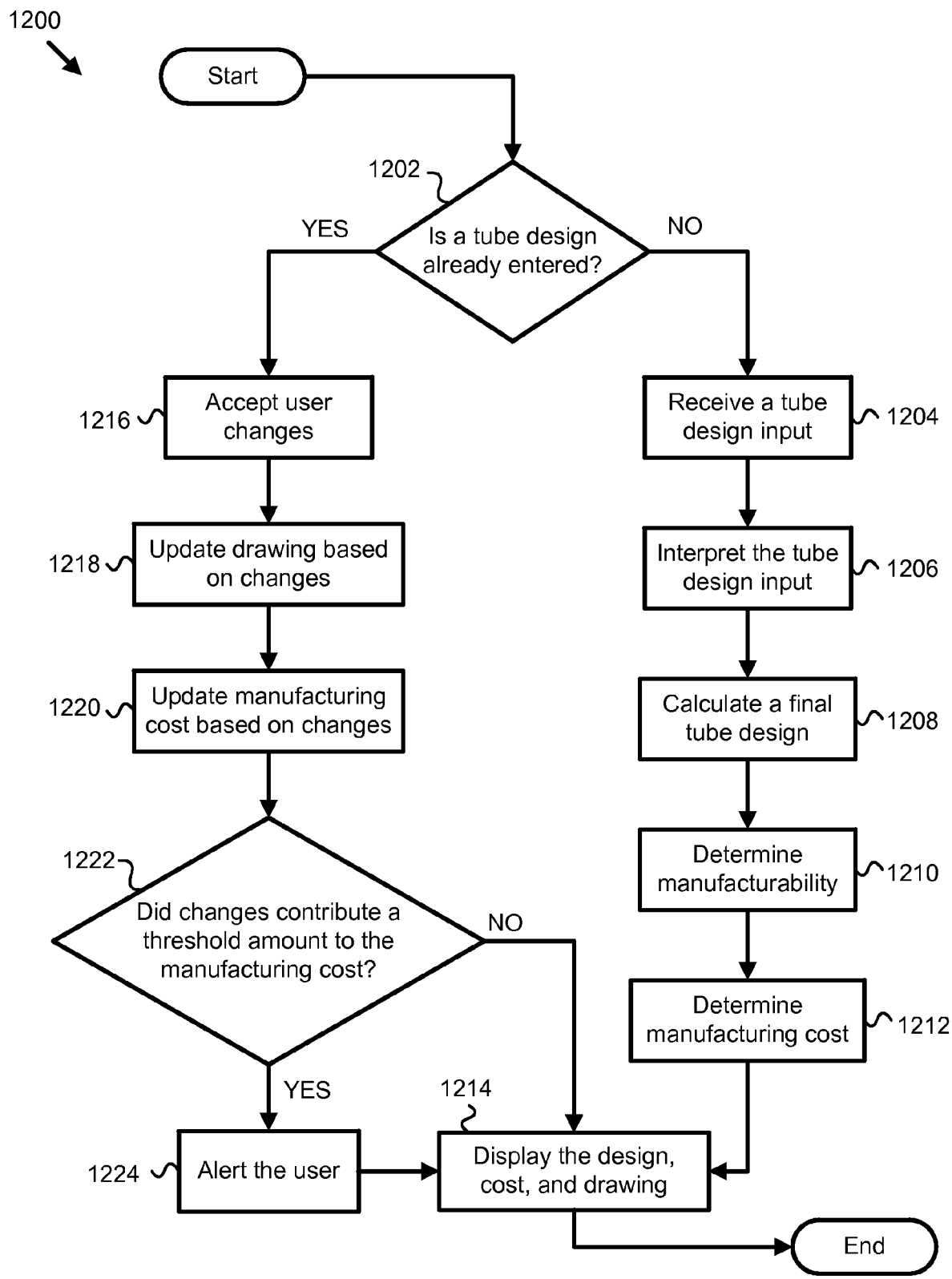
FIG. 12 is a schematic flow chart illustrating an alternative embodiment of a method for rapid design of an emissions component installation in accordance with the present invention.

FIG. 12 is a schematic flow chart illustrating an alternative embodiment of a method 1200 for designing an emissions component installation 101 in accordance with the present invention. The user interface module 308 may check 1202 whether a tube design 402 is already entered into the user interface 406. If a tube design 402 is not entered into the user interface 406, the user interface module 308 may receive 1204 a tube design input 402. The tube configuration module 302 may interpret 1206 the tube design input 402, and the tube calculator module 304 may calculate 1208 a final tube design 404.

The manufacturing module 316 may then determine 1210 the final tube design manufacturability 504, and the costing module 318 may determine 1210 the manufacturing cost 506 of the final tube design 404. The display module 306 may then display 1214 the final tube design 404, manufacturing cost 506, and drawing 414 to the user 130.

If the tube design is already entered (1202 with a "YES" determination), the user interface module may be configured to accept 1216 user changes to the tube design input 402. The tube calculator module 304 may be configured to update 1218 the drawing 414 and final tube design 404 based on the changes 418. The costing module 318 may be configured to update 1220 the manufacturing cost 506 based on the changes 418.

The optimization module 320 may then check 1222 whether the user-entered changes 418 contribute a manufacturing cost threshold amount 508 to the manufacturing cost 506. If the user-entered changes 418 do not contribute a manufacturing cost threshold amount 508 to the manufacturing cost 506, the display module 306 may then display 1214 the final tube design 404, manufacturing cost 506, and drawing 414 to the user 130. If the user-entered changes 418 do contribute a manufacturing cost threshold amount 508 to the manufacturing cost 506, the optimization module 320 may be configured to alert 1224 the user 130 that the user-entered change 418 contributed more than the manufacturing cost threshold amount 508 to the manufacturing cost 506 for the final tube design 404. The display module 306 may then display 1214 the final tube design 404, manufacturing cost 506, and drawing 414 to the user 130.

Figure 13:
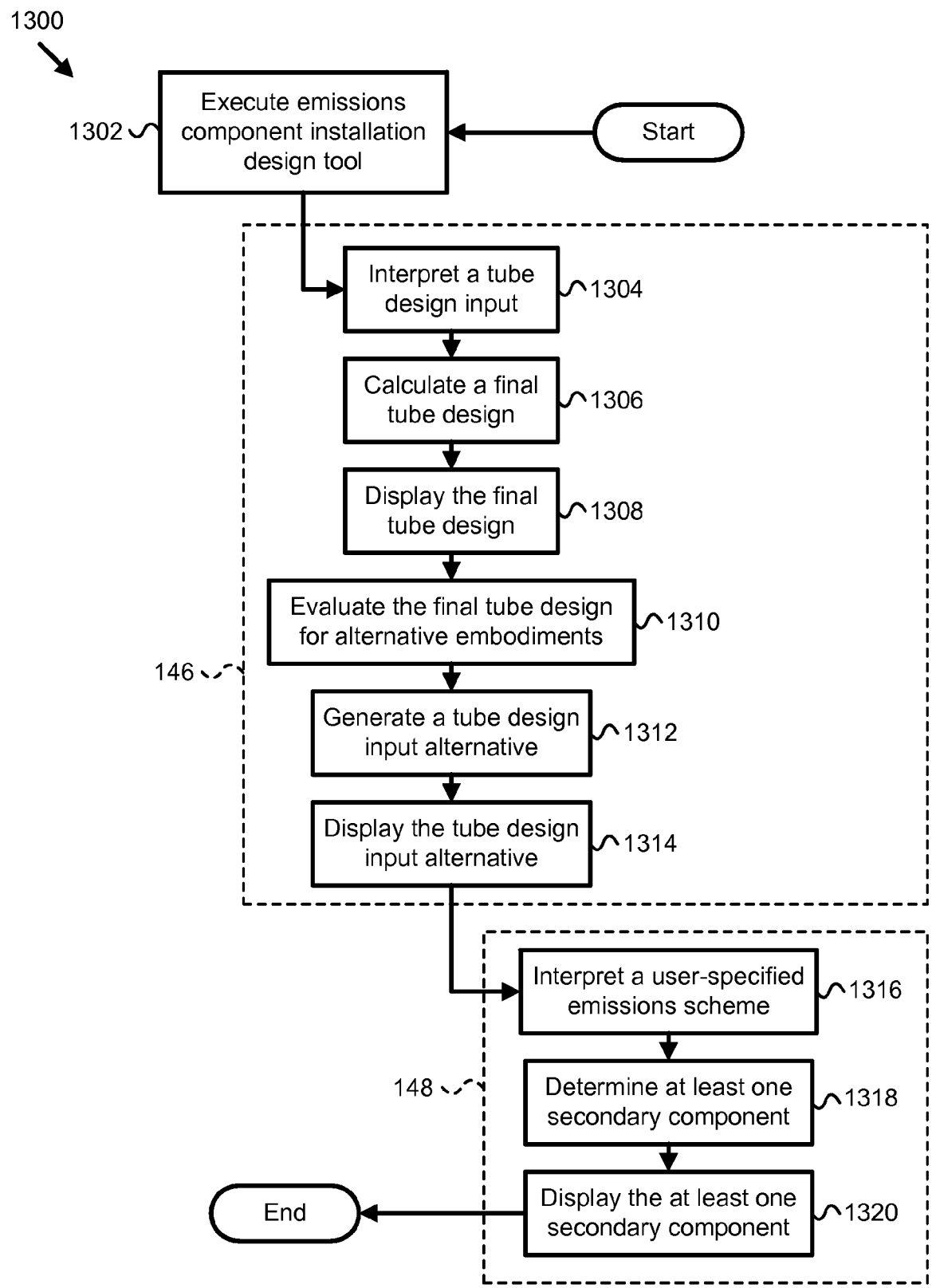
FIG. 13 is a schematic flow chart illustrating a method to enhance an emissions component installation design in accordance with the present invention.

FIG. 13 is a schematic flow chart illustrating a method 1300 to enhance an emissions component installation 101 design in accordance with the present invention. The method 1300 may begin with a user 130 executing 1302 an emissions component installation design tool 144. The tube configuration module 302 may interpret 1304 a tube design input 402, and the tube calculator module 304 may calculate 1306 a final tube design 404. The display module 306 may then display 1308 the final tube design 404.

The method 1300 may continue with the optimization module 320 evaluating 1310 the final tube design for alternative embodiments of the tube design input 402 that may generate a lower manufacturing cost 506, and the optimization module 304 may generate 1312 a tube design input alternative 510 that implements the alternative embodiment of the tube design input 402. The display module 306 may then display 1314 the tube design input alternative 510 to the user 130.

A secondary component selection module 322 may interpret 1316 a user-specified emissions scheme 602 comprising at least one emissions reduction feature. The secondary component selection module 322 may determine 1318 at least one secondary component recommendation 612 bypassing at least one emissions reduction feature based on the emissions scheme 602 to the emissions challenge module 324, and receiving at least one secondary component recommendation 612 where the recommended secondary component addresses at least one operational challenge corresponding to at least one emissions reduction feature. The display module 306 may then display 1320 the secondary component recommendation 612 to the user 130.

From the foregoing discussion, it is clear that the invention provides a system, method, and apparatus for rapid design of emissions component installations. The invention further provides a method for analysis and optimization of an existing emissions component installation design. The invention overcomes previous limitations in the art by allowing the user to quickly and easily configure tubing configurations, and allows a user to receive immediate help in reducing the impact of new emissions reduction features in an installation according to criteria that are important to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to design a tubing configuration comprising:
    a tube configuration module configured to interpret a tube design input, the tube design input comprising point locations, bend criteria, and end conditions;
    a tube calculator module configured to calculate a final tube design based on the tube design input;
    a secondary component selection tool configured to determine at least one secondary component recommendation based on a user-specified emissions scheme; and
    a display module configured to display the final tube design and the at least one secondary component recommendation to a user.

2. The apparatus of claim 1, further comprising a user interface module configured to receive the tube design input from the user and provide the tube design input to the tube configuration module.

3. The apparatus of claim 2, further comprising a complexity verification module configured to determine whether the tube design input exceeds a complexity threshold, and to prompt the user to simplify the tube design input if the tube design input exceeds the complexity threshold.

4. The apparatus of claim 1, further comprising a design integrity module configured to set an error indicator if the tube design input does not comprise a minimum set of information.

5. The apparatus of claim 1, further comprising a design compatibility detection module configured to set a conflict indicator if the tube design input comprises one of a conflicting design input and an erroneous design input.

6. The apparatus of claim 1, wherein the end conditions comprise at least one member selected from the group consisting of a flare definition, a dent condition, a slot type, a threading specification, specifications for a half couple, and a size change adapter.

7. The apparatus of claim 1, wherein the tube design input further comprises at least one aftertreatment component.

8. The apparatus of claim 1, wherein the tube design input further comprises at least one member selected from the group consisting of a tube outer diameter, a tube wall thickness, and a tube material.

9. The apparatus of claim 1, wherein the tube comprises a material comprising a member selected from the group consisting of aluminum, steel, copper, plastic, rubber, and silicone.

10. The apparatus of claim 1, wherein the tube design input further comprises at least one member selected from the group consisting of a tube coating, a tube interior finish, and a tube exterior finish.

11. The apparatus of claim 1, wherein the tube design input further comprises a cross-sectional shape of the tube, the cross-sectional shape of the tube comprising a member selected from the group consisting of a square, a rectangle, a parallelogram, a triangle, an ellipse, and a circle.

12. The apparatus of claim 2, further comprising a manufacturing module configured to determine the final tube design manufacturability, a costing module configured to determine a manufacturing cost of the final tube design, and wherein the display module is further configured to display the manufacturing cost to the user.

13. The apparatus of claim 12, wherein the costing module is further configured to update the manufacturing cost in response to user-entered changes in the tube design input.

14. The apparatus of claim 13, further comprising an optimization module configured to alert the user when a user-entered change in the tube design input contributes a threshold amount to the manufacturing cost.

15. The apparatus of claim 14, wherein the optimization module is further configured to determine a tube design input alternative, similar to the user-entered change in the tube design input that contributes a threshold amount to the manufacturing cost, such that the tube design alternative contributes less than the threshold amount to the manufacturing cost, and wherein the threshold amount comprises a member selected from the group consisting of an absolute amount of money, a percentage of cost higher than the cost of an available alternative, and a percentage of the manufacturing cost.

16. The apparatus of claim 12, wherein the user interface module is further configured to receive a desired quantity from the user, and wherein the costing module is further configured determine the manufacturing cost based on the desired quantity and a plant capacity.

17. The apparatus of claim 1, wherein the display module is further configured to display one of a drawing suitable for manufacture of the final tube design, and drawing data suitable to specify a drawing of the final tube design in a computer aided design program.

18. The apparatus of claim 17, wherein the display module is further configured to update the one of a drawing suitable for manufacture of the final tube design, and drawing data suitable to specify a drawing of the final tube design in a computer aided design program, in response to user-entered changes in the tube design input.

19. The apparatus of claim 1, wherein the final tube design comprises a design for a tube comprising a fluid conduit for an application.

20. The apparatus of claim 1, wherein the final tube design comprises a design for a tube comprising a structural element of an application.

21. The apparatus of claim 1, wherein the secondary component selection tool comprises:
an emissions challenge module configured to store a set of operational challenges corresponding to a set of emissions reduction features, and further configured to store a set of operational challenges addressed corresponding to a set of secondary components; and
a secondary component selection module configured to:
interpret the user-specified emissions scheme, the user-specified emissions scheme comprising at least one emissions reduction feature;
provide the set of emissions reduction features to the emissions challenge module;
receive the at least one secondary component recommendation from the emissions challenge module such that the at least one secondary component recommendation addresses at least one of the set of operational challenges corresponding to the at least one emissions reduction feature; and
provide the at least one secondary component recommendation to the display module.

22. The apparatus of claim 21, wherein the set of emissions reduction features comprises at least one member selected from the group consisting of high pressure fuel injection, multiple fuel injections, exhaust gas recirculation (EGR), a diesel oxidation catalyst (DOC), a $NO_x$ adsorption catalyst, a diesel particulate filter (DPF), a selective catalytic reduction (SCR) system, a three-way catalyst, and a four-way catalyst, an ultra-low sulfur fuel requirement, and a low crankcase emissions requirement.

23. The apparatus of claim 21, wherein the set of secondary components comprises at least one member selected from the group consisting of an improved lubricity fuel filter, a fuel filter with improved fuel water separation, a fuel-borne catalyst additive filter, an acid-neutralizing lubrication filter, a micro-screen bypass lubrication filter, a centrifuge lubrication filter, an ultra-low ash oil specification, an open crankcase ventilation filter, a closed crankcase ventilation filter, and an enhanced air intake system.

24. An apparatus for rapidly addressing emissions component challenges comprising:
an emissions challenge module configured to store a set of operational challenges corresponding to a set of emissions reduction features, and further configured to store a set of operational challenges addressed corresponding to a set of secondary components; and
a secondary component selection module configured to:
interpret a user-specified emissions scheme comprising at least one emissions reduction feature;
provide at least one emissions reduction feature to the emissions challenge module;
receive at least one secondary component recommendation from the emissions challenge module such that at least one secondary component recommendation addresses at least one operational challenge corresponding to at least one emissions reduction feature; and
provide at least one secondary component recommendation to the display module;
wherein the display module is further configured to display at least one secondary component recommendation to the user.

25. The apparatus of claim 24, wherein the set of emissions reduction features comprises at least one member selected from the group consisting of high pressure fuel injection, multiple fuel injections, exhaust gas recirculation (EGR), a diesel oxidation catalyst (DOC), a $NO_x$ adsorption catalyst, a diesel particulate filter (DPF), a selective catalytic reduction (SCR) system, a three-way catalyst, and a four-way catalyst, an ultra-low sulfur fuel requirement, and a low crankcase emissions requirement.

26. The apparatus of claim 24, wherein the set of secondary components comprises at least one member selected from the group consisting of an improved lubricity fuel filter, a fuel filter with improved fuel water separation, a fuel-borne catalyst additive filter, an acid-neutralizing lubrication filter, a micro-screen bypass lubrication filter, a centrifuge lubrication filter, an ultra-low ash oil specification, an open crankcase ventilation filter, a closed crankcase ventilation filter, and an enhanced air intake system.

27. A system for rapid design of an emissions component installation, the system comprising:
an internal combustion engine;
a user-specified emissions scheme comprising at least one emissions reduction feature;

a user-specified tube design input comprising point locations, bend criteria, and end conditions;

an emissions component installation design tool, the emissions component installation design tool comprising at least one member selected from the group consisting of a tube configuration tool and a secondary component selection tool;

wherein the tube configuration tool is configured to:
  interpret the tube design input;
  calculate a final tube design based on the tube design input;
  display the final tube design to a user; and wherein the secondary component selection tool is configured to:
  interpret a user-specified emissions scheme comprising at least one emissions reduction feature; and
  determine at least one secondary component that addresses at least one operational challenge corresponding to the at least one emissions reduction feature.

28. The system of claim 27, wherein the at least one emissions reduction feature comprises at least one member selected from the group consisting of wherein the set of emissions reduction features comprises at least one member selected from the group consisting of high pressure fuel injection, multiple fuel injections, exhaust gas recirculation (EGR), a diesel oxidation catalyst (DOC), a $NO_x$ adsorption catalyst, a diesel particulate filter (DPF), a selective catalytic reduction (SCR) system, a three-way catalyst, and a four-way catalyst, an ultra-low sulfur fuel requirement, and a low crankcase emissions requirement.

29. The system of claim 27, wherein the at least one secondary component comprises at least one member selected from the group consisting of an improved lubricity fuel filter, a fuel filter with improved fuel water separation, a fuel-borne catalyst additive filter, an acid-neutralizing lubrication filter, a micro-screen bypass lubrication filter, a centrifuge lubrication filter, an ultra-low ash oil specification, an open crankcase ventilation filter, a closed crankcase ventilation filter, and an enhanced air intake system.

* * * * *